June 3, 1958 B. R. CLAY 2,837,594

COLOR SYNCHRONIZATION

Filed Nov. 30, 1953

INVENTOR.
BURTON R. CLAY

BY [signature]
ATTORNEY

United States Patent Office 2,837,594

Patented June 3, 1958

2,837,594

COLOR SYNCHRONIZATION

Burton R. Clay, Woodbury, N. J., assignor to Radio Corporation of America, a corporation of Delaware Application November 30, 1953, Serial No. 394,930

9 Claims. (Cl. 178—5.4)

The present invention relates to signalling circuits, and more particularly to color synchronization of the type employed in color television receivers.

Color television is the reproduction on the viewing screen of a receiver of not only the relative luminescence or brightness, but also the color hues and saturations of the details in the original scene.

Complete cooperation between the transmitter and receiver is essential in the successful operation of television equipment. As a result much emphasis is placed on the development and utilization of synchronizing methods. This is particularly true in color television wherein not only is it necessary to maintain accurate deflection scanning but it is also necessary to maintain accurate synchronism in the timing of component color selection.

The electrical transfer of images in color may be accomplished by additive methods. Additive methods produce natural color images by breaking down the light from an object into a predetermined number of selected primary or component colors. Color images may be transferred electrically by analyzing the light from an object into not only two image elements as is accomplished by a normal scanning procedure but by also analyzing the light from elemental areas of objects or images into selected primary or component colors and thereby deriving therefrom a signal representative of each of the selected component colors. A color image may be then reproduced at a remote point by appropriate reconstruction from a component color signal train.

In order to utilize the existing radio frequency spectrum most advantageously, there has been proposed a color television system which conforms to a set of standards known as the NTSC compatible television specifications which are described at page 88 of "Electronics" for February 1952. In accordance with the color television system referred to above, the transmission of a brightness signal is substantially the same as that conventionally employed for black and white television transmission. In addition, a color subcarrier wave, spaced from the main carrier wave by a frequency substantially equal to that of an odd multiple of one-half the line scanning frequency, is employed to carry the chromaticity information.

The chrominance information includes two signals designated as "I" and "Q" signals having bandwidths of 1½ mc. and ½ mc. respectively. By using suitable modulation means the "I" signal and the "Q" signal are used to modulate the color subcarrier wave at the transmitter. In the receiver this chrominance information is subjected to suitable demodulation whereupon color difference signals corresponding to the transmitted color information are produced which are applied to the tri-color kinescope.

In order for the chrominance information to be transferred from transmitter to receiver the phase angle of the various waves involved must be maintained with considerable accuracy. It is evident therefore that the means of demodulation which involves separating the "I" and "Q" signal information from the modulated subcarrier wave must utilize circuitry which not only permits the separation of the chrominance information from the color subcarrier wave but must operate with precision and be capable of utilizing any synchronizing information accompanying the chrominance information to maintain this precision.

Synchronization is accomplished by the periodic transmission of a burst of a signal wave equal in frequency to that of the unmodulated subcarrier carrying this color information. A good description of the employment of a burst for color synchronization may be found in an article entitled "Recent Developments in Color Synchronization in the RCA Color Television System," published February 1950 by the Radio Corporation of America. In the modern color television system conforming to NTSC standards, this burst consists of approximately eight cycles of a 3.58 megacycle signal located on the back porch of the horizontal synchronizing pulse. The phase of the burst is 57° ahead of the I signal.

It is a primary object of the present invention to improve the timing of the color selection in a color television receiver.

Another object of the invention is to permit more accurate selection of color information.

It is a further object of this invention to utilize the frequency control capabilities of a push-pull oscillator to accurately lock or control the color information circuits using the synchronizing information which is included in the transmitted color video signal.

According to this invention a crystal controlled push-pull oscillator is used which has its two halves adjusted operate at frequencies above and below the center frequency output. In addition, feedback paths are provided from the respective plates to the respective grids, which in the case of one half provides a voltage shifted ahead 90° from the plate of that circuit, and for the other half, a voltage lagging 90° from the plate of that circuit. When the burst signal is applied to the crystal circuit which drives the grids of both the two halves of the oscillator the operation of the oscillator does not change if the burst and the oscillator are suitably matched in frequency and phase. If the burst frequency and phase and the oscillator frequency and phase are not suitably matched, an unbalance is caused in the oscillator which shifts the frequency and phase to that of the burst signal.

The manner in which this invention operates to achieve the objects noted above will be more clearly understood after the following detailed description of the drawings in which.

Figures 1, 2, 3, 4, 5, 6:
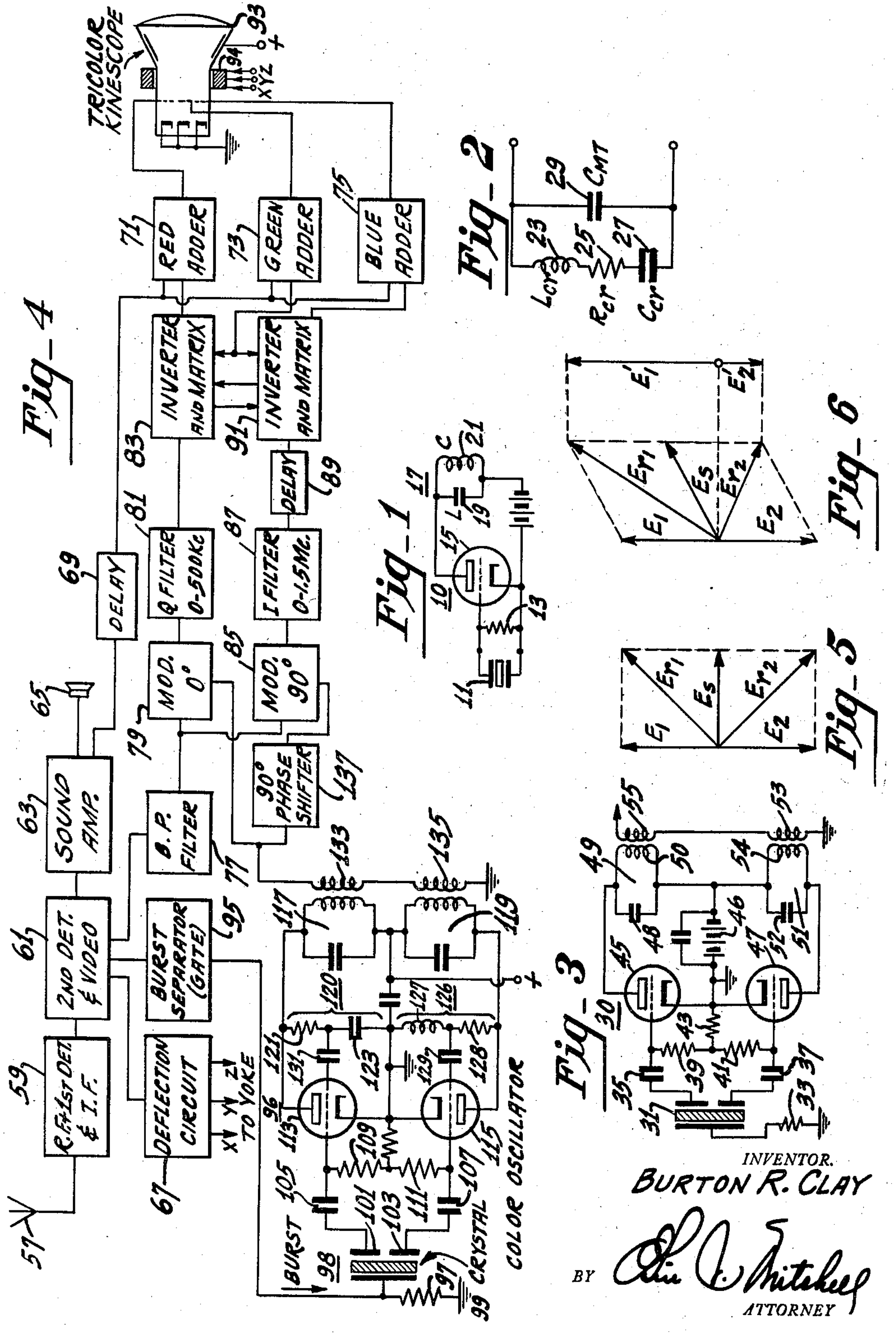
Figure 1 is a schematic diagram of a simple piezoelectric crystal oscillator.
Figure 2 is the equivalent circuit of a piezoelectric crystal.
Figure 3 is a schematic diagram of a piezoelectric crystal controlled push-pull oscillator circuit which is basic to the invention to be described.
Figure 4 shows a color television receiver circuit which utilizes the phase and frequency information from the burst separator to properly phase the piezoelectric crystal controlled push-pull oscillator whose output is used to aid in the color selection in the receiver circuit.

Figure 5 shows a vector diagram representations of the crystal voltage and the burst voltage which are applied to the respective grids of the piezoelectric crystal controlled push-pull oscillator when the burst frequency and phase are correct with respect to the oscillator frequency and phase; and Figure 6 shows the vector diagram of the voltages reaching the respective grids of the crystal controlled push-pull oscillator when the burst frequency signal and the oscillator signal as produced by the crystal are not in proper phase, showing the unbalance between the magnitude of the signals being applied to the respective grids, these signals being denoted $E'_1$ and $E'_2$ respectively.

The present invention may be used advantageously in any color television system conforming to the NTSC compatible television standards. It is instructive at this time in order to foster a better understanding of the invention to discuss the fundamentals of operation of the basic crystal oscillator circuits which are shown in Figures 1 and 3. The control of frequency by means of crystals is based upon the piezoelectric effect. When certain crystals, noticeably quartz, are compressed or stretched in certain directions, electric charges appear on the surfaces of the crystal which are perpendicular to the angles of strain. Conversely when such crystals are placed between two metallic surfaces between which a difference of potential exists the crystals expand or contract. If the potential applied to the plates is alternating, the crystal is caused to develop oscillations, the amplitude of the oscillations being greatest at the mechanical resonance frequence of oscillation of the crystal.

The circuit shown in Figure 1 is a commonly used crystal oscillator circuit 10. The action of this circuit is readily understood when it is noted that the crystal and crystal mounting may be represented by the equivalent electrical circuit shown in Figure 2 where it is seen that the crystal may be represented by a circuit consisting of the holder capacitance $C_{MT}$ and the series section consisting of the inductances $L_{cr}$, the resistance $R_{cr}$ and the capacitance $C_{cr}$. The value of the crystal in controlling frequency lies in the extreme sharpness of this resonant circuit. The Q of the equivalent circuit of such a crystal is of the order of one hundred times that which can be readily attained in electrical circuits. Because of this sharpness of resonance, the crystal can oscillate only over a very narrow frequency range and hence the frequency stability of the frequency oscillator is very high. When the temperature of the crystal is maintained constant by means of a temperature control system, the frequency drift may be made less than two parts in ten million. It is evident that such a circuit can be extremely valuable in color television receiver circuits where frequency and phase control are integral factors in the ability of a color television receiver to accurately reproduce color information.

Returning to Figure 1, a crystal 11 is shown connected between grid and cathode of the vacuum tube 15. This crystal is shunted by the resistance 13. In the plate circuit of the vacuum tube 15 is included the resonant circuit 17 which consists of an inductance 19 and a capacitance 21 in parallel. The entire circuit now is denoted the crystal oscillator circuit 10. In this crystal oscillator circuit 10 the resonant circuit 17 is tuned to a frequency higher than that of the crystal 11, so that the reactance of the plate circuit is inductive at the crystal resonance frequency. The amplitude of oscillation is determined by the amount of inductive reactance in the plate circuit and by the grid-plate interelectrode capacity. These two parameters determine the amount of feedback coupling the output circuit and the input crystal circuit, thereby setting up the conditions leading to oscillation—it being necessary that the grid voltage be substantially 180° out of phase with respect to the plate voltage.

Figure 3 shows a schematic diagram of a push-pull oscillator 30 which is based on the simple crystal oscillator 10 shown in Figure 1. Here the crystal 31 is so connected that one of the crystal holding electrodes is connected to ground through a resistance 33. The other crystal holding electrode is actually in two separate sections, one going through a condenser 35 to the grid of tube 45 and the other going through condenser 37 to the grid of tube 47. The respective grids are connected to ground through the resistance network comprising resistors 39, 41 and 43. In the plate circuit of tube 45 is the resonant circuit 49 consisting of the capacitance 48 and the inductance 50 in parallel. In the plate circuit of tube 47 is the resonant circuit 51 consisting of the capacitance 52 and the inductance 54 in parallel. These are connected in push-pull and are fed by the common battery source 46. The output of the oscillator, is derived by using the two coupling loops 53 and 55, from the combined tank circuits 49 and 51. In order to have the push-pull oscillator circuit work effectively, the tank circuit 49 is adjusted to a frequency slightly above that of the crystal 31 and the tank circuit 51 is adjusted to a frequency slightly below the frequency of the crystal 31. During operation of this push-pull oscillator, the shift from center frequency of the output is dependent on which half of the oscillator is operating more strongly and also the extent of this unbalance favors the circuit of the tube 45, then the output frequency will be slightly above that of the crystal 31. If the unbalance favors the circuit of tube 47, then the output frequency will be slightly below that of the frequency of crystal 31. Therefore, by involving a suitable control mechanism to utilize this ability to control frequency and phase by unbalance, the crystal control push-pull oscillator circuit becomes an effective means of providing for color hold and timing for color selection.

Consider now the circuit shown in Figure 4. A video modulated signal arrives at the antenna 57. This video modulated signal consists of both a luminance signal which contains the black and white information and the chrominance signal which is the modulated subcarrier which contains the I and Q signals. The modulated subcarrier is demodulated at a suitable stage in the receiver. The I and Q signals derived from the demodulation of the modulated subcarrier are combined with the black and white information afforded by the luminance signal and applied to the color kinescope 93.

In order for the ultimate recovery of the red, green, and blue color information to be effectively made in the receiver, a reference signal of proper phase accompanies the color television signal; this reference signal is sent in the form of a burst of at least eight cycles of a 3.58 megacycle signal on the back porch of the horizontal synchronizing pulse, this burst being accurately phased with respect to the phases of the I and Q signals.

The received signal also contains the sound information.

The initial handling of the color television signal is the same as that employed in normal black and white receivers.

The video modulated signal information arriving at the antenna 57 is passed through the R. F. amplifier, first detector and I. F. amplifier stages locked together as 59 and is applied to the second detector and video stages 61. The circuitry involved in these stages is identical to those used in standard black-and-white receivers. For details of such circuits, see, for example, A. Wright, "Television Receivers," RCA Review, March 1947. From this point the audio portion of the signal is recovered, sent through the sound amplifier 63 and applied to the loud speaker 65. At the second detector and video stages 61, the synchronizing signals are sent to the deflection circuits 67 and then to the yokes 94 of the tri-color kinescope. The black and white information in the form of the luminance signal issues forth from the second detector and video stages 61 and passes through the delay network 69 to the red adder 71, the green adder 73 and the blue adder 75. Here it is combined with the correct red, green, and blue color difference signals which have been recovered from the I and Q signals, these I and Q signals having issued from the second detector and video amplifier 61, passed through a band pass filter 77 and demodulated and filtered by the Q circuit modulator and filters 79 and 81 respectively, and the I filter and modulator 87 and 85 respectively; they are then impressed on the inverter and matrix circuits 83 and 91 from which the red, green, and blue color difference signals are recovered. The outputs of the red adder 71, green adder 73, and blue adder 75 are applied to the respective grids of the tri-color kinescope 93 to produce the color picture on the face of the tri-color kinescope 93.

The remaining branch at the output of the second detector 61 makes use of the timing or synchronizing information in the signal. This synchronizing information is in the form, as has been noted, of a burst of several cycles of the color synchronizing frequency which are located on the back porch of the horizontal sync pulse, The phase of the synchronizing burst is used to properly phase the demodulation of the I and Q signals since in order to comply with the NTSC signal specifications, the phase of the burst should be 57° ahead of the phase of the I component which leads the phase of the Q component by 90°. The separation of the phase of the burst signal from the video signal is accomplished by use of a burst gate 95 following the second detector and video 61. This burst gate 95 is turned on only for a brief interval following each horizontal sync pulse by means of a pulse obtained from a multivibrator which is in turn controlled by horizontal sync pulses. These separated bursts are amplified and then used to control the frequency and phase of the local oscillator 96 whose output is fed directly to the Q modulator 79 and through a 90° phase shifter 137 to the I modulator 85.

Consider now in detail the operation of the local oscillator 96 which is tuned to the color synchronizing frequency 3.58 mc. and whose phase is precisely maintained by the burst which follows the horizontal sync pulse and precedes the actual scanning of the line over which the phase of the oscillator is to be held constant.

The circuit of the local oscillator 96 is a crystal controlled push-pull oscillator whose circuit resembles very closely that of the basic circuit shown in Figure 3, with the exception that connected between plate and cathode of tube 113 is a resistance 121 in series with a condenser 123 whose midjunction is connected to the grid of tube 113 by using a bypass condenser 131; connected between plate and cathode of tube 115 is a resistance 128 in series with an inductance 127 whose midjunction is connected to the grid of tube 115 by use of the bypass condenser 129.

The precise action of the resistance-condenser network 120 and the resistance-inductance networks 126 respectively are here considered in view of their fundamental operations which have considerable bearing on the overall operation of the oscillator. Consider first the action of the resistance 121 and the condenser 123. When an alternating current voltage exists between plate and cathode of tube 113, if the reactance of the condenser 123 is much smaller than that of the resistance 121, then the voltage developed across the condenser 123 will lag the plate-to-cathode A.-C. voltage by 90°. Similarly the voltage across the inductance 127 will lead the A.-C. voltage between plate and cathode of tube 115 by 90°. The net result of having these voltages applied in their respective phases to the grids of tubes 113 and 115 is to introduce reactive components into the plate current which influence the feedback path from the tank circuits 117 and 119 back to the crystal 98, and therefore influence the resonant frequencies of these tank circuits.

As in the case of the push-pull oscillator circuit in Figure 3, the crystal controlled push-pull crystal oscillator circuit 96 has its two halves operable at different frequencies, one-half slightly above and one-half slightly below the center frequency which is equal to the color subcarrier frequency 3.58 mc. The shift from center frequency of the output is dependent on first which half of the oscillator is operating more strongly, and secondly, the extent of this unbalance. The grid tank circuit of the crystal controlled push-pull oscillator circuit 96 includes the crystal 98 which resonates very close to the center frequency. The crystal 98 receives a reactive energy addition during burst information intervals; i. e., when burst is applied the crystal is returned so as to maintain its average frequency equal to the frequency of the burst. The feedback path 120 feeds a voltage shifted approximately 90° from the plate of tube 13 to its own grid. The result of this network 120 is to change the frequency by a small amount in a direction such as to compensate for any frequency change. Similarly the 90° network consisting of the network 126 is placed in the grid circuit of tube 115 and fed from the plate of tube 115, but in this case the frequency shift is opposite in direction to that of the network 120. If the oscillator is set up without the networks 120 and 126 and tuned to the center frequency, then either tube may be cut off and the oscillator will still operate and produce a wave at the center frequency. If the both networks 120 and 126 are now included, the oscillator halves are separately tuned as above noted, and both tubes 113 and 115 operate, the center frequency is still maintained; but if tube 113 cuts off, the oscillator frequency tends to change slightly in one direction. Likewise, if the tube 115 is cut off, the oscillator frequency tends to change slightly in the opposite direction. Thus it is seen that the phase of the output signal is dependent on a balance betweeen the two halves of the oscillator.

The burst signal from the burst separator 95 is applied to both grids of the oscillator. The signals on the two grids are, however, 180° apart. If the incoming burst is 90° out of phase with either of the grids, then no effect on the output frequency is produced. If, however, the oscillator frequency is at some other phase with respect to the burst and unbalance is effected, a vector diagram of this condition is that shown in Figure 5. Let $E_1$ and $E_2$ be the voltages on the grids of tubes 113 and tube 115 respectively at balance and let $E_s$ be the burst signal. At the grid of tube 113 the vector sum of $E_s$ and $E_1$ is $E_{r1}$ and at the grid of tube 115 the vector sum of $E_s$ and $E_2$ is $E_{r2}$. However, only the component of $E_{r1}$ along the $E_1$ line is effective in producing plate voltage in tube 113; likewise with tube 115 the only effective component of $E_{r2}$ is along $E_2$. These components here are obviously equal in magnitude.

Consider the case shown in Figure 6 where the burst signal $E_2$ is not 90° out of phase with respect to either of the signals applied to the grids of tube 113 and tube 115 respectively. It is evident from this vector diagram that the resonant vectors $E_{r1}$ and $E_{r2}$ will no longer be of the same length and their projections on the plane in which $E_1$ and $E_2$ lie, namely $E'_1$ and $E'_2$ are now of dissimilar length and the ratio of their magnitudes describes the degree of the oscillator unbalance caused by the burst and varies as the phase of the burst with respect to the oscillator output. It is clear then that the greatest unbalance is obtained when the burst is in phase with one grid and completely out of phase with the other; and also note that equilibrium is established when $E_s$ and $E_1$ are 90° apart.

Another important feature of this invention is that noise, when present is fed to both grids equally in phase and magnitude, the vector difference of the noise components at the grid is such that the noise is effectively cancelled. The extent of noise immunity depends on the balance. The more perfect the balance the more immune from noise the circuit becomes.

Having thus described the invention, what is claimed is:

1. In a color television receiver system of the type employing a color synchronizing burst, the frequency of which is employed for color selection, a color synchronizing circuit comprising in combination, a burst separator having a burst signal output circuit, a vacuum tube oscillator circuit having a resonant plate tank circuit in its plate circuit and a piezoelectric crystal circuit in its grid circuit such that the frequency of resonance of said resonant plate tank circuit and said piezoelectric crystal circuit is substantially the same as that of the color synchronizing burst, a feedback circuit means coupled from said resonant plate tank circuit to said piezoelectric crystal circuit for purpose of inducing reactive components of current in said resonant plate tank circuit, means for utilizing said reactance component of current to compensate for shifts in the frequency and phase of said oscillator, means for introducing said color synchronizing bursts into said grid circuit of said vacuum tube oscillator, means for utilizing said feedback circuit to adjust frequency and phase of said vacuum tube oscillator to the frequency and phase of said burst, and means for utilizing output of said oscillator in said color television receiver system.

2. The invention as set forth in claim 1 and wherein the output tank circuit is tuned to a frequency above that of said piezoelectric crystal oscillator and said feedback circuit consists of a series resistance-capacitance network connected between the plate and cathode of said tube of said vacuum tube oscillator circuit, and means are provided for impressing the voltage appearing across said capacitor between the control grid and cathode of said tube.

3. The invention as set forth in claim 1 and wherein the output tank circuit is tuned to a frequency below that of said piezoelectric crystal oscillator and said feedback circuit consists of a series resistance-inductance network connected between the plate and cathode of said vacuum tube oscillator circuit, and there is provided means for impressing the voltage appearing across said inductance between the control grid and cathode of said tube.

4. A color television receiver system of the type employing a color synchronizing burst which is for color selection, a color synchronizing circuit comprising in combination, a burst separator having a burst signal output terminal, a vacuum tube oscillator circuit made up of a pair of electron control devices each having an input electrode and an output electrode and an internal interelectrode capacitance furnishing a feedback path between said output electrode and input electrode, a resonant tank circuit operatively connected to each of said output eletrodes, means for coupling said input electrodes to a piezoelectric crystal common to both of said input electrodes and having a resonant frequency substantially the same as the frequency of said burst and slightly lower than frequency of one of said resonant tank circuits but slightly higher than frequency of said other resonant tank circuit, means for utilizing said internal interelectrode capacitance and said frequency differences between said piezoelectric crystal and said resonant tank circuits to effect a balance at which said vacuum tube oscillator circuit will oscillate, means for utilizing said color synchronizing burst in the circuit of said input electrodes such as to effect control of the balance of said vacuum tube oscillator and thereby control the frequency and phase of the signal appearing at said output terminal, means for providing mutual coupling from both of said resonant tank circuits to an output terminal, and means for utilizing the signal at said output terminal in said color television receiver circuit.

5. The invention as set forth in claim 4 and wherein said color synchronizing burst is preceded by a horizontal synchronizing pulse; a time delay network, means for utilizing said delay network to delay said horizontal synchronizing pulse, a burst gate, and means for utilizing said delayed horizontal synchronizing pulse to open said burst gate.

6. A signalling circuit comprising in combination, a reference frequency signal source having an output terminal, a push-pull oscillator circuit consisting of a first and second electron control devices each having a plate, a cathode and a control grid, a piezoelectric crystal having a frequency substantially that of said reference signal source, means for mutually coupling said control grids to said piezoelectric crystal, first and second resonant tank circuits, the first of said resonant tank circuits being tuned to a frequency slightly higher than the frequency of said piezoelectric crystal, the first of said resonant tank circuits coupled to the plate of the first of said electron control devices and the second of said resonant tank circuits tuned to a frequency slightly lower than that of said piezoelectric crystal, the second of said resonant tank circuits being coupled to the plate of the second of said electron control devices, an output terminal, means for mutually coupling said output terminal to both said resonant tank circuits, means for injecting said reference frequency signal onto said grids of said electron control devices such that phase between said reference frequency signal voltage and voltage from said piezoelectric crystal appearing at said grids determines the balance or unbalance of said push-pull oscillator and thereby the frequency and phase of signal appearing at said output terminal, a first feedback circuit connected between plate and cathode of said first electron control device, means for utilizing said first feedback circuit to provide an out-of-phase voltage on the grid of said first electron control device suitable for providing reactive currents in said first resonant tank circuit to decrease push-pull oscillator unbalance and shift frequency of said push-pull oscillator toward that of said reference frequency signal, a second feedback circuit connected between plate and cathode of said second electron control device, means for utilizing said second feedback circuit to provide an out-of-phase voltage on the grid of second electron control device suitable for providing reactive currents in said second resonant tank circuit to decrease push-pull oscillator unbalance and shift frequency of said push-pull oscillator toward that of said reference frequency signal in conjunction with the frequency shift produced by utilization of first feedback circuit.

7. A color television receiver system of the type employing a color synchronizing burst following the horizontal synchronizing pulse, the frequency of said burst being employed for color selection; a color synchronizing circuit comprising in combination a burst separator having a burst output terminal, a push-pull vacuum tube oscillator circuit consisting of a first and second electron tube having a plate and a cathode and a control grid, a piezoelectric crystal having substantially the same frequency as that of said synchronizing burst and having three terminals, one of said crystal terminals being coupled to said control grid of said first electron tubes and the other of said crystal terminals being coupled to said control grid of said second electron tube, another of said crystal terminals being coupled to a fixed potential, a pair of resonant tank circuits, one of said resonant tank circuits being utilized in plate circuit of said first electron tube and tuned to a frequency slightly higher than that of said piezoelectric crystal and another of said resonant tank circuits utilized in the plate circuit of said second electron tube and tuned to a frequency slightly lower than that of said piezoelectric crystal, and wherein the combined effect of off-tuning coupled with the feedback circuit provided by the interelectrode capacitances of said electron tubes leads to oscillation; an output terminal, means for mutually coupling said output terminal to both of said resonant tank circuits, means for injecting said color synchronizing burst voltage from said output terminal of said burst separator onto said grids of said electron tubes in same phase such that phase between said burst voltage and the voltage from said piezoelectric crystal appearing determines balance or unbalance of push-pull operation and thereby the frequency and phase of signal appearing at said output terminal, a first feedback circuit connected between plate and cathode of said first electron control device, means for utilizing said first feedback circuit to provide an out-of-phase voltage on grid of said first electron control device suitable for providing reactive currents in said first resonant tank circuit to decrease the push-pull oscillator unbalance and shift the frequency of said push-pull oscillator toward that of said burst signal, a second feedback circuit connected between plate and cathode of said second electron control device, means for utilizing said second feedback circuit to provide an out-of-phase voltage on grid of second electron control device suitable for providing reactance currents in said second resonant tank circuit to decrease the push-pull oscillator unbalance and shift the frequency of said push-pull oscillator toward that of said burst signal in conjunction with the frequency shift produced by utilization of first feedback circuit.

8. The invention as set forth in claim 7 and wherein said first feedback circuit is a first resistor in series with a capacitance, one end of said first resistor connected to said plate of said first electron tube and one end of said capacitor connected to said cathode of said first electron tube, a junction terminal of said series first resistance and said capacitance coupled to grid of said first electron tube through a bypass condenser, and also wherein said second feedback circuit is a second resistor in series with an inductance, one end of said second resistor connected to said plate of said second electron tube, and one end of said inductance connected to said cathode of said second electron tube, means for coupling the junction of said series second resistance and said inductance to said grid of said second electron tube through a bypass condenser.

9. The invention as set forth in claim 7 and wherein said piezoelectric crystal and said means of utilization of said burst signal in said grid circuit comprise a network wherein the voltage delivered between cathode and grid of first electron tube by said piezoelectric crystal is equal in magnitude but 180° out of phase with respect to voltage delivered between cathode and grid of said second electron tube by said piezoelectric crystal, and wherein the voltage delivered between cathode and grid of said first electron tube by said burst signal utilization means lags voltage delivered there by said piezoelectric crystal by 90° and voltage delivered between cathode and grid of said second electron tube by said burst signal utilization means leads voltage delivered there by said piezoelectric crystal by 90°.

References Cited in the file of this patent

UNITED STATES PATENTS

| | | |
|---|---|---|
| 2,411,765 | Usselman et al. | Nov. 26, 1946 |
| 2,593,005 | Bridges | Apr. 15, 1952 |
| 2,635,140 | Dome | Apr. 4, 1953 |
| 2,653,187 | Luck | Sept. 22, 1953 |

UNITED STATES PATENT OFFICE

CERTIFICATE OF CORRECTION

Patent No. 2,837,594 June 3, 1958

Burton R. Clay

It is hereby certified that error appears in the printed specification of the above numbered patent requiring correction and that the said Letters Patent should read as corrected below.

Column 2, line 31, after "adjusted" insert -- to --; column 4, lines 12 and 13, after "unbalance" insert -- . If the unbalance --; column 5, line 14, strike out "phase of the --.

Signed and sealed this 28th day of October 1958.

(SEAL)

Attest:

KARL H. AXLINE
Attesting Officer

ROBERT C. WATSON
Commissioner of Patents